May 26, 1970  T. L. STEELE ET AL  3,514,630

LINE TRACER CONTROL DEVICE

Filed Nov. 15, 1967  2 Sheets-Sheet 1

INVENTORS
THOMAS L. STEELE &
RALPH K. SNOW, JR.

BY Dunlap and Laney
ATTORNEYS

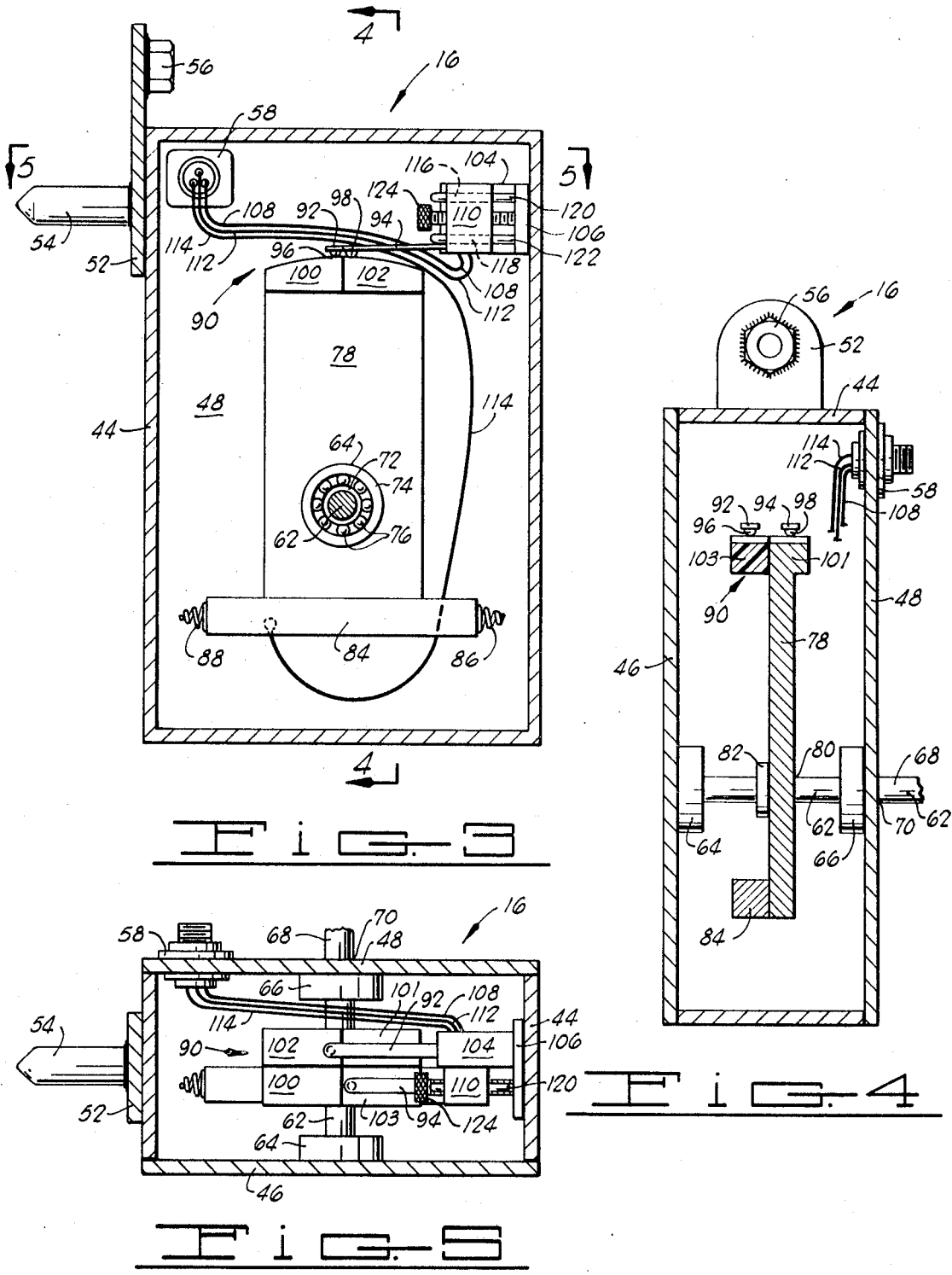

United States Patent Office 3,514,630
Patented May 26, 1970

3,514,630
LINE TRACER CONTROL DEVICE
Thomas L. Steele and Ralph K. Snow, Jr., Oklahoma City, Okla., assignors to CMI Corporation, a corporation of Oklahoma
Filed Nov. 15, 1967, Ser. No. 683,256
Int. Cl. H01h 3/16
U.S. Cl. 307—118                                    10 Claims

ABSTRACT OF THE DISCLOSURE

Apparatus for providing a control indication of variations of moving machinery or such relative to a line tracer, the apparatus consisting of a movable sensing rod which can be maintained in contact with the line tracer and which transmits its movement to a rotary contact device which provides electrical output indicative of movement of the tracer from a preselected disposition with respect to the machinery or such. The rotary contact device consists of a pair of oppositely oriented, commutating contact surfaces in cooperation with a pair of contacts such that an electrical output will be provided on one or the other in response to a variation of the rotor position to one or the other sides of a preselected null point.

CROSS-REFERENCE TO RELATED APPLICATION

The subject matter of the present application is particularly related to that of application Ser. No. 446,239 now U.S. Pat. No. 3,423,859, filed Apr. 7, 1965 in the name of George W. Swisher et al., entitled "Road Construction Method and Apparatus" and assigned to the present assignee.

BACKGROUND OF THE INVENTION

Field of the invention

The invention relates generally to line tracer following apparatus and, more particularly, but not by way of limitation, it relates to improvements in tracer line position sensing mechanisms capable of generating electrical signals for drive control of heavy, motive machinery or such.

Description of the prior art

The prior art includes various teachings of devices which are employed to detect movement relative to a tracer line to thereafter construct or generate a proportionate correcting movement. The prior art types, especially as employed with hydraulic drive systems and heavy construction machinery, have generally tended to compromise as to the desirable characteristics; that is, a sensitive control would sacrifice reliability and vice-versa. Thus, most existing control devices have insufficient sensitivity for use with the late-model grading, paving, asphalting and other forms of construction machinery which are capable of operating within very small tolerance levels at relatively fast speeds. The present invention overcomes the prior difficulties and enables fast and extremely accurate tracer line sensing.

SUMMARY OF THE INVENTION

The present invention contemplates a tracer following device which provides a characteristic electrical output signal in response to a sensing variation relative to the tracer line. In a more limited aspect, the device consists of a movable means which bears against and follows the tracer line and which transmits the movement accordingly through a shaft into a rotor means which controls the electrical contact between a power source and one of two electrical outputs in accordance with rotor position toward one or the other sides of a selected null point or point of no contact. The control device may be supported from heavy motive machinery in any desired position and the width or gap of the control null point is readily adjustable in accordance with the requirements of a particular operation.

Therefore, it is an object of the present invention to provide a tracer line following device which is extremely sensitive as well as reliable in operation.

It is also an object of the invention to provide an electro-mechanical tracer control device for controlling hydraulic drive valving which is adjustable as to its operating null point.

It is still another object of the present invention to provide such a tracer follower unit which is readily adjusted into its proper operation position and which can then function for long periods of maintenance-free operation.

Finally, it is an object of the present invention to provide a tracer line control device which is relatively simple and has few moving parts but which is extremely reliable in operation and offers marked improvement in tracer line sensing and drive control of heavy motive equipment.

Other objects and advantages of the invention will be evident from the following detailed description when read in conjunction with the accompanying drawings which illustrate the invention.

BRIEF DESCRIPTION OF THE DRAWINGS

FIG. 3 is a side-view of the tracer control unit housing with the near-side panel removed;

FIG. 4 is a vertical section taken along lines 4—4 of FIG. 3; and

FIG. 5 is a horizontal section taken along lines 5—5 of FIG. 3.

DESCRIPTION OF THE PREFERRED EMBODIMENT

Figures 1, 2:
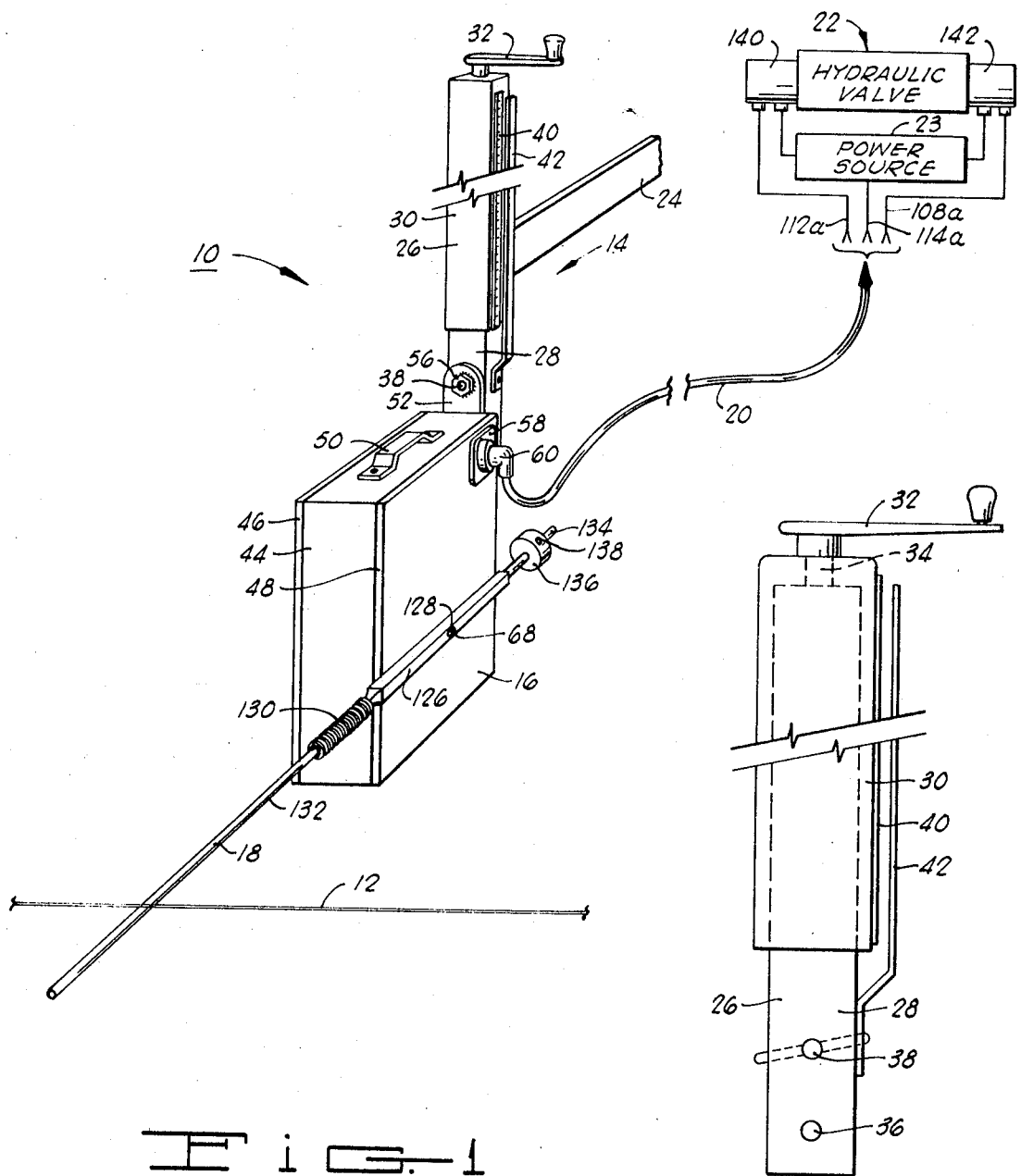
FIG. 1 is a perspective view of the invention shown in connection with a schematically illustrated hydraulic valve.
FIG. 2 is an enlarged front elevation of a support assembly as shown in FIG. 1.

Referring to the drawings in detail, FIG. 1 illustrates a tracer control device 10 as it might be employed when supported from heavy motive machinery, e.g. roadbuilding equipment or such, in line sensing disposition adjacent a guide string or tracer line 12. The tracer control device 10 consists of a support assembly 14 which may extend from the road construction machinery to support a control unit 16 which, in turn, extends a pivotable sensing rod 18 into contact with tracer 12. An electrical control connection is made from control unit 16 through a suitable cable 20 to such as a hydraulic valve 22 which would be associated with a particular drive function on the road construction machinery. A power source 23 such as the system D-C energization may be utilized to provide power for operating the hydraulic valve 22.

The support assembly 14 consists of lateral supports 24, one or more in various angular array, which extend from the associated machinery to secure a vertically adjustable support post 26 outboard therefrom. As shown also in FIG. 2, the support post 26 consists of a lower shaft portion 28 and an upper shaft portion 30 received downwardly thereover in telescoping alignment. An adjustment handle 32 may be employed to change the vertical adjustment of upper shaft portion 30 with respect to lower shaft portion 28; for example, a conventional adjustment connection might be with handle 32 secured to a wide-pitch vertical screw 34 which extends down within lower shaft portion 28 but through a threaded portion or welded nut near the top thereof so that rotation of crank 32 will move the upper shaft portion 30 up or down with respect to lower shaft portion 28. The upper shaft portion 30 and lower shart portion 28 may be constructed from suitable lengths of square tubing or such having the properly sized and mating cross-sectional configurations.

The lower end of lower shaft portion 28 is adapted to receive the control unit 16 by means of a guide hole 36 and a threaded securing screw 38. A graduated plate 40 along one side of upper shaft portion 30 provides a relative distance measuring device for equating and/or changing the position of sensing rod 18 relative to upper shaft portion 26 and the support arm 24. An additional plate member 42 is secured to lower shaft portion 28 and to extend upward along graduated plate 40 to provide a sighting and/or marking reference.

The control unit 16 consists of a housing member 44 having opposed side panels 46 and 48 attached thereto. The housing member 44 is also fitted with a suitable handle 50 and a securing bracket 52 which serves to provide an attachment surface for connection with the lower end of the support post 26. Thus, and referring also to FIGS. 3 and 4, the securing bracket 52 is welded or suitably fastened to the housing member 44 and it extends a guide pin 54 for insertion within guide hole 36 of the support post (FIG. 2), and a nut 56 is welded to the opposite side of securing bracket 52 to receive the securing screw 38 therethrough. A suitable screw-type receptacle 58 and cable connector 60 provide electrical output connection between the control unit 16 and able 20.

Referring also to FIGS. 3–5, the control unit 16 receives rotational input from sensing rod 18 via a rotor shaft 62. The shaft 62 is rotationally supported by a pair of bearing assemblies 64 and 66 which are affixed to the respective side panels 46 and 48, and one end 68 of shaft 62 extends through a hole 70 through side panel 48 for affixure to the sensing rod 18. The bearings 64 and 66 may be a conventional type of bearing consisting of an inner race 72, an outer race or frame portion 74 and a plurality of bearing balls 76.

A rotor 78, formed of metal or electrically conductive material, receives shaft 62 through a hole 80 in secure affixure as afforded by a suitable collar 82. For example, collar 82 may be secured to shaft 62 as by key or set screw fittings and additional conventional fasteners may then be employed to secure collar 82 to rotor plate 78. A counterweight member or metallic bar 84 is rigidly affixed to the lower end of rotor plate 78 and a pair of resilient bumpers, e.g. spring members 86 and 88, are affixed on opposite ends for contact with the side walls of housing 44 in the event of excessive rotor movement.

An upper commutating surface or rotor head 90 is constructed to allow alternative electrical conduction conditions through a pair of contact leaves 92 and 94 which support respective electrical contacts 96 and 98 urged downwardly upon opposite sides of ortor head 90. Each side of rotor head 90 is constructed to expose a conductive or metallic rotor block 100 and 101 and a respective nonconductive rotor block 102 and 103. As shown in FIG. 5, the conductive rotor block 102 and 103. As shown in FIG. 5, the conductive rotor blocks 100 and 101 combined with respective nonconductive rotor blocks 102 and 103 on each side of rotor head 90 are disposed in oppositely oriented relationship such that clockwise movement of rotor 78 results in completion of a conduction path from rotor plate 78 and rotor block 100 through contact 98 and contact leaf 94, while a counterclockwise movement of rotor plate 78 results in an opposite conduction state with continuity between rotor plate 78, rotor block 100, contact 96 and the contact leaf 92.

The contact leaf 92 is rigidly secured within a contact block 104 which, in turn, is rigidly affixed to a mounting member 106 attached to the side wall of housing member 44. The contact leaf 92 is connected to a conductor 108 which provides electrical continuity to the receptacle 58. The contact leaf 94 is rigidly secured in a movable contact block 110 wherein it is electrically connected to a wire conductor 112 which leads up to receptacle 58. The remaining wire conductor 114 provides the common or return circuit connection and it is connected to the conductive rotor plate 78 as, for example, by a suitable eyelet and screw fastening connection between rotor plate 78 and the counterweight 84.

The contact block 104 is rigidly affixed to maintain contact leaf 92 and its contact 96 in a permanent position; however, the contact block 110 and its contact leaf 94 are laterally movable to provide for a variation in the width of the null point or gap between contacts 96 and 98. Thus, the contact block 110 is formed with a pair of lateral holes 116 and 118 such that it can be mounted or movably retained on respective pins 120 and 122. An adjustment screw 124 is threaded through contact block 110 to provide lateral positioning of contact block 110 and therefore contact leaf 94 and its electrical contact 98. Thus, the null point or non-conduction gap can be widened or narrowed by turning of the adjustment screw 124 with consequent lateral movement of contact block 110.

Referring again to FIG. 1, the sensing rod 18 is constructed in a manner whereby rugged and dependable structure is employed to yield very sensitive operation. A first bar portion 126 is formed with a centrally disposed hole 128 through which the outer end 68 of rotor shaft 62 is rigidly received. One end of bar 126 is then affixed to a resilient flexural member 130 which, in turn, is connected to a sensing bar 132. Flexural member 130 affords a suspension of sensing bar 132 which is sufficiently rigid for sensing purposes but which alleviates danger of damages from bending through accidental contact with foreign objects. The other end of bar 126 is affixed to or formed to extend as a bar portion 134 which supports a movable counterweight 136 therealong. The counterweight 136 is formed to include a set screw 138 so that it can be secured at a selected point along bar portion 134 to provide the desired amount of upward urging or tension of sensing bar 132 against tracer line 12. It should be understood too that some usages may find preference for a downward urging of sensing bar 18, in this case couunterweight 136 may be disposed as a weight on the downward revolving side of sensing rod 18, or a fork or eyelet guide member (not shown) may be formed on the end of an unweighted sensing bar 132 to carry out positive following of the tracer line 112.

The electrical output from control unit 16 is provided through cable connector 60 and cable 20 for input to hydraulic valve 22. The hydraulic valve 22 is a conventional type which may be employed to control certain heavy machinery drive functions. Thus, completing the circuit between input lead 112a and common lead 114a through power source 23 would result in energization of solenoid 140 to place hydraulic valve 42 in one phase of operation. An electrical output or completed circuit from control unit 16 applied via input leads 108a and common lead 114a would then actuate the remaining solenoid 142 to place hydraulic 22 in another or the opposite operating phase.

OPERATION

The line tracer control device 10 may be employed for various applications which require such line or other reference following apparatus. Primarily, however, the device is intended for level and steering control on heavy construction equipment such as road-building machinery. The aforementioned U.S. application, Ser. No. 446,239, is directed to road building machinery which requires six such tracer control devices 10, each controlling a specific drive function. Thus, two tracer control devices 10 are mounted fore and aft upon one side of the road-building machinery to follow a line tracer and provide control indication for hydraulic apparatus controlling linear drive of the machinery. In addition, four more tracer control units 10 are mounted one at each outer corner of the road-building machinery to derive depth or level control indications which, in turn, are applied to energize respective hydraulic apparatus which responds to follow in intended manner.

The particular tracer control device 10 shown in FIG. 1 is oriented to sense vertical level; however, it is a simple matter to reorient the tracer control device 10 and its selected support assembly 14 so that sensing rod 18 is vertically oriented and detecting variations in movement which are lateral or transverse to the tracer 12. The tracer control device 10 is initially adjusted to sense about a predetermined reference point. That is, the crank 32 of support post 26 can be rotated to position control unit 16 up or down at a predetermined level such that the sensing rod 18 contacts the line tracer 12 in an attitude whereby control unit 16 is within its null point with no control output or electrical current flow present through cable 20. Thus, as shown in FIG. 3, the null point would find rotor blade 78 vertically oriented with each of the insulative rotor blocks 102 and 103 in contact with respective contact leaves 92 and 94, i.e. conductive rotor blocks 100 and 101 finding no contact. An adjustment of the screw 124 can serve to position contact leaf 94 and its associated contact 98 to present the gap or size of the null point. This adjustment is generally employed for the purpose of maintaining a certain initial gap length which is sufficient to insure a minimum proper gap length, even after contacts 96 and 98 have become substantially worn down through long use.

Movement of the tracer control device 10 parallel to line tracer 12 will result in variations of sensing rod 18, such variations generating electrical output from control unit 16 through cable 20 to the associated hydraulic valve 22. Thereupon, the hydraulic valve 22 exercises its control to vary the attitude or position of the associated machinery so that the entire machinery is repositioned at a level where sensing rod 18 finds a null point and no electrical output is generated. Referring also to FIG. 3, when sensing rod 18 is urged downward, the rotor plate 78 is turned in a clockwise direction until the electrically conductive rotor block 100 is brought into contact with contact 98 and contact leaf 94. This would then complete an electrical circuit from the common lead through conduction plates 78, rotor block 100 and contact leaf 94 for return via lead 112 to the cable receptacle 58. The cable 20 then conducts the electrical energization which completes a circuit from power source 23 through leads 114 and 112 to energize the solenoid 140 for particular actuation of hydraulic valve 22. Opposite or upward movement of sensing rod 18 would drive the rotor plate 78 in a counter-clockwise direction and opposite electrical energization would take place through the conductive rotor block 101 (FIG. 5) and contact leaf 92 to provide electrical energization between common lead 114 and output lead 108. This energization would apply D-C power from power source 23 to energize the solenoid 142.

The repetitive energization through one of conductor rotor blocks 101 or 100 provides an electrical energization which activates following mechanism such that the control unit 16 continually seeks its gap position or null point. The device can be adjusted as to sensitivity by both adjustment of screw 124 to set the null point width between contact leaves 92 and 94, and also by adjustment of the counterweight 136 or other of the mechanical response limiting elements such as the length of sensing bar 132, resilience of flex member 130, etc.

The foregoing discloses a novel tracer line following unit which is capable of rapid and accurate response and which gives reliable service over long operating periods with little or no requirement for maintenance and adjustment. The device manifests distinct advantage in its simplicity of design and utilization of a minimum of moving parts. Further, the device functions in an electro-mechanical manner which requires a minimum of energy conversion and, therefore, little or no inherent losses occur to affect control sensitivity.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A control device for providing an output indication of line tracer disposition relative thereto, comprising:
   a rotor means;
   a rotor shaft affixed through said rotor means;
   means for supporting said rotor shaft for freely rotatable movement;
   sensing rod means affixed to one end of said rotor shaft for rotation therewith and extending into contact with the line tracer, said sensing rod means being maintained in contact with said line tracer;
   an electrical power source;
   first rotor block means of electrically conductive material secured to said rotor means and being electrically connected to said electrical power source;
   first contact means;
   first contact block means having said first contact means affixed thereto and in electrical connection to a first control output, said first contact block means supporting said first contact means adjacent said first rotor block means to provide electrical contact upon rotation of said rotor means in a first direction;
   second rotor block means, of electrically conductive material secured to said rotor means and being electrically connected to said electrical power source;
   second contact means; and
   second contact block means having said second means affixed thereto and in electrical connection to a second control output, said second contact block means supporting said second contact means adjacent said second rotor block means to provide electrical contact upon rotation of said rotor means in a second direction.

2. A control device as set forth in claim 1 which is further characterized to include:
   a pair of additional rotor block means which are formed of insulative material and which are affixed adjacent each of said conductive rotor block means to form a smooth race for traverse of said respective first and second contact means when not in contact with the respective rotor block means.

3. A control device as set forth in claim 1 wherein said sensing rod means comprises:
   first rod means secured to one end of said rotor shaft for rotation therewith;
   flexural means connected to one end of said first rod means;
   second rod means connected to said flexural means to be extended into contact with said line tracer; and
   means for continually urging said second rod means into contact with said line tracer thereby to follow its position.

4. A control device as set forth in claim 3 which is further characterized in that said means urging is a counterweight affixed to the other end of said first rod means to urge said second rod means upward against the underside of side line tracer.

5. A control device as set forth in claim 1 which is further characterized to include:
   housing means including a housing frame and opposite side walls and enclosing said rotor means, rotor shaft and means for supporting, and having one end of said rotor shaft and said sensing rod means disposed adjacent and outside of said housing means.

6. A control device as set forth in claim 5 wherein said means for supporting comprises:
   first and second ball bearing assemblies each mounted to opposite sidewalls of said housing means and receiving said rotor shaft therethrough.

7. A control device as set forth in claim 6 wherein said sensing rod means comprises:
   first rod means secured to one end of said rotor shaft for rotation therewith;
   flexural means connected to one end of said first rod means;
   second rod means connected to said flexural means to be extended into contact with said line tracer; and
   means for continually urging said second rod means into contact with said line tracer thereby to follow its position.

8. A control device as set forth in claim 7 which is further characterized to include:
   weighting means secured to the opposite end of said rotor means from that containing the rotor block means; and
   a pair of resilient bumper members secured on each side of said rotor means adjacent said weighting means to provide resilient stopping against said housing member in the event of excessive movement of said rotor means.

9. A control device for providing an output indication of line tracer disposition relative thereto, comprising:
   a rotor means;
   a rotor shaft affixed through said rotor means;
   means for supporting said rotor shaft for freely rotatable movement;
   first rod means secured to one end of said rotor shaft for rotation therewith;
   flexural means connected to one end of said first rod means;
   second rod means connected to said flexural means to be extended into contact with said line tracers;
   means for continually urging said second rod means into contact with said line tracer thereby to follow its position;
   an electrical power source;
   first means energized by said power source upon rotational movement of said rotor means to provide a first control output; and
   second means energized by said power source upon opposite rotational movement of said rotor means to provide a second control output.

10. A control device as set forth in claim 9 wherein said means for supporting comprises:
   first and second ball bearing assemblies each mounted to opposite side walls of said housing means and receiving said rotor shaft therethrough.

References Cited

UNITED STATES PATENTS

| | | | |
|---|---|---|---|
| 2,844,882 | 7/1958 | Earley et al. | 200—61.44 X |
| 2,868,909 | 1/1959 | Guntert et al. | 200—61.44 |
| 2,873,541 | 2/1959 | Eliason | 318—20.220 |
| 3,111,070 | 11/1963 | Pollitz. | |
| 3,227,833 | 1/1966 | Davies et al. | 200—61.18 X |
| 3,343,008 | 9/1967 | Bancroft | 307—119 |

ROBERT K. SCHAEFER, Primary Examiner

T. B. JOIKE, Assistant Examiner

U.S. Cl. X.R.

172—4.5; 200—61.44